US012762595B2

(12) United States Patent
Osborn et al.

(10) Patent No.: US 12,762,595 B2
(45) Date of Patent: Oct. 13, 2026

(54) AUTHENTICATING VOICE TRANSACTIONS WITH PAYMENT CARD

(71) Applicant: Capital One Services, LLC, McLean, VA (US)

(72) Inventors: Kevin Osborn, Newton, MA (US); Jeffrey Rule, Chevy Chase, MD (US)

(73) Assignee: Capital One Services, PLLC, McLean, VA (US)

(*) Notice: Subject to any disclaimer, the term of this patent is extended or adjusted under 35 U.S.C. 154(b) by 0 days.

(21) Appl. No.: 18/828,205

(22) Filed: Sep. 9, 2024

(65) Prior Publication Data

US 2025/0182176 A1 Jun. 5, 2025

Related U.S. Application Data

(63) Continuation of application No. 16/504,987, filed on Jul. 8, 2019, now Pat. No. 12,086,852.

(51) Int. Cl.
*G06Q 30/0601* (2023.01)
*G06F 3/16* (2006.01)
(Continued)

(52) U.S. Cl.
CPC ......... *G06Q 30/0613* (2013.01); *G06F 3/167* (2013.01); *G06Q 20/12* (2013.01);
(Continued)

(58) Field of Classification Search
CPC ........... G06Q 30/0613; G06Q 30/0605; G06Q 30/0625; G06Q 30/0641; G06Q 20/12;
(Continued)

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |

(Continued)

FOREIGN PATENT DOCUMENTS

| | | | |
|---|---|---|---|
| CN | 101192295 | A | 6/2008 |
| CN | 104662569 | A | 5/2015 |

(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Courtney P Jones
(74) *Attorney, Agent, or Firm* — KDW Firm, PLLC

(57) ABSTRACT

Disclosed are a system and techniques for authenticating voice transactions with a payment card. A system example may include a purchase application executing on a smart digital device, and a payment card. The purchase application may receive an item purchase request via an audio input device of the smart digital device for an item available to purchase. The received item purchase request may be sent to an application server or the like, and, in response, a list of merchants offering the item available for purchase and each merchant's price for the item available to purchase may be received. The list may be presented on a smart digital device display for selection of at least one of the merchants selling the item may be received. A payment card may be inserted into the smart digital device's near-field communication field to provide a signal containing encrypted data.

20 Claims, 6 Drawing Sheets

300

(51) Int. Cl.

| | |
|---|---|
| ***G06Q 20/12*** | (2012.01) |
| ***G06Q 20/34*** | (2012.01) |
| ***G06Q 20/38*** | (2012.01) |
| ***G06Q 20/40*** | (2012.01) |
| ***H04W 4/80*** | (2018.01) |

(52) U.S. Cl.
CPC ....... *G06Q 20/352* (2013.01); *G06Q 20/3829* (2013.01); *G06Q 20/40* (2013.01); *G06Q 30/0605* (2013.01); *G06Q 30/0625* (2013.01); *G06Q 30/0641* (2013.01); *H04W 4/80* (2018.02); *G06Q 2220/00* (2013.01)

(58) Field of Classification Search
CPC .. G06Q 20/352; G06Q 20/3829; G06Q 20/40; G06F 3/167; H04W 4/80
See application file for complete search history.

(56) References Cited

U.S. PATENT DOCUMENTS

| | | | | |
|---|---|---|---|---|
| 6,199,114 | B1 | 3/2001 | White | |
| 6,324,271 | B1 | 11/2001 | Sawyer | |
| 6,367,011 | B1 | 4/2002 | Lee | |
| 6,572,015 | B1 | 6/2003 | Norton | |
| 7,252,242 | B2 | 8/2007 | Ho | |
| 7,270,276 | B2 | 9/2007 | Vayssiere | |
| 7,287,692 | B1 | 10/2007 | Patel | |
| 7,374,099 | B2 | 5/2008 | de Jong | |
| 7,527,208 | B2 | 5/2009 | Hammad | |
| 7,568,631 | B2 | 8/2009 | Gibbs | |
| 7,584,153 | B2 | 9/2009 | Brown | |
| 7,628,322 | B2 | 12/2009 | Holtmanns | |
| 7,793,851 | B2 | 9/2010 | Mullen | |
| 7,801,799 | B1 | 9/2010 | Brake, Jr | |
| 7,908,216 | B1 | 3/2011 | Davis | |
| 7,922,082 | B2 | 4/2011 | Muscato | |
| 8,010,405 | B1 | 8/2011 | Bortolin | |
| 8,074,877 | B2 | 12/2011 | Mullen | |
| 8,082,450 | B2 | 12/2011 | Frey | |
| 8,108,687 | B2 | 1/2012 | Ellis | |
| 8,186,602 | B2 | 5/2012 | Itay | |
| 8,196,131 | B1 | 6/2012 | von Behren | |
| 8,249,654 | B1 | 8/2012 | Zhu | |
| 8,276,814 | B1 | 10/2012 | Davis | |
| 8,332,272 | B2 | 12/2012 | Fisher | |
| 8,346,670 | B2 | 1/2013 | Hasson | |
| 8,511,547 | B2 | 8/2013 | Rans | |
| 8,519,822 | B2 | 8/2013 | Riegebauer | |
| 8,750,514 | B2 | 6/2014 | Gallo | |
| 8,870,081 | B2 | 10/2014 | Olson | |
| 9,038,893 | B2 | 5/2015 | Kirkham | |
| 9,129,199 | B2 | 9/2015 | Spodak | |
| 9,183,490 | B2 | 11/2015 | Moreton | |
| 9,275,325 | B2 | 3/2016 | Newcombe | |
| 9,286,606 | B2 | 3/2016 | Diamond | |
| 9,306,753 | B1 | 4/2016 | Vandervort | |
| 9,501,776 | B2 | 11/2016 | Martin | |
| 9,710,744 | B2 | 7/2017 | Wurmfeld | |
| 9,949,065 | B1 | 4/2018 | Zarakas | |
| 9,965,632 | B2 | 5/2018 | Zarakas | |
| 9,965,911 | B2 | 5/2018 | Wishne | |
| 9,977,890 | B2 | 5/2018 | Alberti | |
| 9,978,056 | B2 | 5/2018 | Seo | |
| 9,978,058 | B2 | 5/2018 | Wurmfeld | |
| 9,990,795 | B2 | 6/2018 | Wurmfeld | |
| 10,007,873 | B2 | 6/2018 | Heo | |
| 10,013,693 | B2 | 7/2018 | Wyatt | |
| 10,057,748 | B1 | 8/2018 | Wolf et al. | |
| 10,121,130 | B2 | 11/2018 | Pinski | |
| 10,210,505 | B2 | 2/2019 | Zarakas | |
| 10,242,368 | B1 | 3/2019 | Poole | |
| 10,296,910 | B1 | 5/2019 | Templeton | |
| 10,332,102 | B2 | 6/2019 | Zarakas | |
| 10,360,557 | B2 | 7/2019 | Locke | |
| 10,380,471 | B2 | 8/2019 | Locke | |
| 10,395,244 | B1 | 8/2019 | Mossler | |
| 10,453,054 | B2 | 10/2019 | Zarakas | |
| 10,474,941 | B2 | 11/2019 | Wurmfeld | |
| 10,475,027 | B2 | 11/2019 | Guise | |
| 10,482,453 | B2 | 11/2019 | Zarakas | |
| 10,482,457 | B2 | 11/2019 | Poole | |
| 10,489,774 | B2 | 11/2019 | Zarakas | |
| 10,489,781 | B1 | 11/2019 | Osborn | |
| 10,510,070 | B2 | 12/2019 | Wurmfeld | |
| 10,515,361 | B2 | 12/2019 | Zarakas | |
| 10,535,068 | B2 | 1/2020 | Locke | |
| 10,546,444 | B2 | 1/2020 | Osborn | |
| 10,581,611 | B1 | 3/2020 | Osborn | |
| 10,664,830 | B1 | 5/2020 | Rule | |
| 10,685,349 | B2 | 6/2020 | Brickell | |
| 10,797,882 | B2 | 10/2020 | Rule | |
| 10,880,741 | B2 | 12/2020 | Zarakas | |
| 10,909,525 | B1 | 2/2021 | Dhodapkar | |
| 10,970,691 | B2 | 4/2021 | Koeppel | |
| 10,984,416 | B2 | 4/2021 | Ilincic | |
| 11,037,136 | B2 | 6/2021 | Rule | |
| 11,062,098 | B1 | 7/2021 | Bergeron | |
| 11,120,453 | B2 | 9/2021 | Rule | |
| 11,138,593 | B1 | 10/2021 | Ho | |
| 11,138,605 | B2 | 10/2021 | Aabye | |
| 11,176,540 | B2 | 11/2021 | Gupta | |
| 11,188,908 | B2 | 11/2021 | Locke | |
| 11,216,806 | B2 | 1/2022 | Mossler | |
| 11,297,958 | B2 | 4/2022 | Vukich | |
| 11,334,872 | B2 | 5/2022 | Phillips | |
| 11,361,173 | B2 | 6/2022 | Edwards | |
| 11,392,933 | B2 | 7/2022 | Mossler | |
| 11,392,935 | B2 | 7/2022 | Suresh | |
| 11,416,844 | B1 | 8/2022 | Osterkamp | |
| 11,423,392 | B1 | 8/2022 | Ho | |
| 11,443,292 | B2 | 9/2022 | Sherif | |
| 11,444,770 | B2 | 9/2022 | Wieker | |
| 11,461,764 | B2 | 10/2022 | Rule | |
| 11,481,764 | B2 | 10/2022 | Shakkarwar | |
| 11,488,589 | B1 * | 11/2022 | Fregly | G10L 15/22 |
| 11,521,213 | B2 | 12/2022 | Rule | |
| 11,551,200 | B1 | 1/2023 | Cook | |
| 11,556,918 | B2 | 1/2023 | Mestre | |
| 11,615,395 | B2 | 3/2023 | McHUGH | |
| 11,777,933 | B2 | 10/2023 | Moreton | |
| 2003/0220876 | A1 | 11/2003 | Burger | |
| 2005/0156026 | A1 | 7/2005 | Ghosh | |
| 2005/0228997 | A1 | 10/2005 | Bicker | |
| 2005/0269402 | A1 | 12/2005 | Spitzer | |
| 2007/0276765 | A1 | 11/2007 | Hazel | |
| 2008/0082452 | A1 | 4/2008 | Wankmueller | |
| 2008/0099552 | A1 | 5/2008 | Grillion | |
| 2009/0143104 | A1 | 6/2009 | Loh | |
| 2009/0235339 | A1 | 9/2009 | Mennes | |
| 2009/0282264 | A1 | 11/2009 | Amiel | |
| 2009/0319784 | A1 | 12/2009 | Faith et al. | |
| 2011/0113245 | A1 | 5/2011 | Varadarajan | |
| 2011/0155801 | A1 | 6/2011 | Rowberry | |
| 2012/0143703 | A1 | 6/2012 | Wall | |
| 2013/0030997 | A1 | 1/2013 | Spodak | |
| 2013/0146657 | A1 | 6/2013 | Graef | |
| 2013/0211937 | A1 | 8/2013 | Elbirt | |
| 2013/0311363 | A1 | 11/2013 | Ramaci | |
| 2014/0074637 | A1 | 3/2014 | Hammad | |
| 2014/0074655 | A1 | 3/2014 | Lim | |
| 2014/0081785 | A1 | 3/2014 | Valadas Preto | |
| 2014/0365377 | A1 | 12/2014 | Salama | |
| 2015/0032635 | A1 | 1/2015 | Guise | |
| 2015/0073983 | A1 | 3/2015 | Bartenstein | |
| 2015/0113271 | A1 | 4/2015 | Jooste | |
| 2015/0134513 | A1 | 5/2015 | Olson | |
| 2015/0199673 | A1 | 7/2015 | Savolainen | |
| 2015/0199863 | A1 | 7/2015 | Scoggins | |
| 2015/0254637 | A1 | 9/2015 | Yang | |
| 2015/0317295 | A1 | 11/2015 | Sherry | |
| 2016/0078430 | A1 | 3/2016 | Douglas | |
| 2016/0189143 | A1 | 6/2016 | Koeppel | |
| 2016/0253651 | A1 | 9/2016 | Park | |

(56) References Cited

U.S. PATENT DOCUMENTS

| | | | |
|---|---|---|---|
| 2016/0277383 | A1 | 9/2016 | Guyomarc'h |
| 2016/0307189 | A1 | 10/2016 | Zarakas |
| 2016/0314472 | A1 | 10/2016 | Ashfield |
| 2016/0379217 | A1 | 12/2016 | Hammad |
| 2017/0017957 | A1 | 1/2017 | Radu |
| 2017/0039566 | A1 | 2/2017 | Schipperheijn |
| 2017/0068950 | A1 | 3/2017 | Kwon |
| 2017/0116596 | A1 | 4/2017 | Tsui et al. |
| 2017/0193591 | A1* | 7/2017 | Narasimhan ....... G06Q 30/0641 |
| 2017/0330173 | A1 | 11/2017 | Woo |
| 2018/0039987 | A1 | 2/2018 | Molino |
| 2018/0261223 | A1* | 9/2018 | Jain .................... G06Q 30/0601 |
| 2018/0268132 | A1 | 9/2018 | Buer |
| 2018/0300716 | A1 | 10/2018 | Carlson |
| 2019/0043039 | A1* | 2/2019 | Wilson ................. G06Q 20/085 |
| 2019/0172055 | A1 | 6/2019 | Hale |
| 2019/0188705 | A1* | 6/2019 | Ecker ..................... G06Q 20/40 |
| 2019/0197182 | A1* | 6/2019 | Yeh ..................... G06F 16/3334 |
| 2019/0303945 | A1 | 10/2019 | Mitra |
| 2020/0097965 | A1* | 3/2020 | Castoro ................ G06Q 20/209 |
| 2020/0294043 | A1* | 9/2020 | Clarke ................... G06Q 30/02 |
| 2021/0004806 | A1 | 1/2021 | Noe |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0059091 | A1* | 2/2022 | Brandel .................... G06F 8/44 |
| 2022/0114581 | A1 | 4/2022 | Upadhye |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0398566 | A1 | 12/2022 | Rule |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0169505 | A1 | 6/2023 | Rule |
| 2023/0354020 | A1 | 11/2023 | Rule |
| 2023/0359839 | A1 | 11/2023 | Lovgren |

FOREIGN PATENT DOCUMENTS

| | | | |
|---|---|---|---|
| CN | 107004196 | A | 8/2017 |
| CN | 109313759 | A | 2/2019 |
| GB | 2516861 | A | 2/2015 |
| GB | 2551907 | A | 1/2018 |
| JP | 2010226336 | A | 10/2010 |
| JP | 2017513167 | A | 5/2017 |
| KR | 20150140132 | A | 12/2015 |
| KR | 20150146061 | A | 12/2015 |
| KR | 20190035352 | A | 4/2019 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2019106811 | A1 | 12/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive. org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 23, 2019]. Retrieved from Internet URL: https://www.cs.umd.edu/~jkatz/papers/aggregateMACpdf, 11 pages.

Pourghomi, P., et al., "A Proposed NFC Payment Application," International Journal of Advanced Computer Science and Applications, 4(8): 173-181 (2013).

Saush, "Getting information from an EMV chip card with Java," Sep. 8, 2006, WordPress, pp. 1-13.

Saxena, N., "Lecture 10: NMAC, Hmac and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

200

300

AUTHENTICATING VOICE TRANSACTIONS WITH PAYMENT CARD

CROSS-REFERENCE TO RELATED APPLICATIONS

This application is a continuation of U.S. patent application Ser. No. 16/504,987, filed on Jul. 8, 2019, the disclosure of which is incorporated herein by referenced in its entirety.

BACKGROUND

A smart digital assistant (SDA) is a device that has speakers, microphones, internet access and the capability to recognize and perform tasks in response to voice commands within the vicinity of the smart digital assistant. The SDAs in response to the voice commands may be able to perform different tasks, such as present news items, the current weather, play music, and communicate with friends and family.

However, more and more of interactions with the cloud go through voice-recognition-equipped SDAs, but there is very little authentication. Moreover, most SDAs allow guest access and attempt to distinguish guest's voices from authorized user's voices, but there is no secure authentication that an authorized user provided the commands recognized by the SDA.

It would be helpful if users were able to authenticate themselves to the SDA without having to provide unfettered access to their accounts, say passwords out loud, or similar unwieldy methods of authenticating themselves to the SDA.

SUMMARY

An example of a disclosed method includes providing, in response to receiving via a smart digital device a voice request for a purchase of a requested item, a list of items available for purchase that substantially match the requested item to an output device of the smart digital device. The output device of the smart digital device is at least one of a display or a speaker. The list of items available for purchase is output via the output device. An item to purchase from the list of items available for purchase is selected. Encrypted data from a payment card may be received via a near-field communication interface of the smart digital device. The encrypted data is generated by a cryptographic algorithm that uses an encryption key. The encryption key may be stored in a memory of the payment card and generated based on a master key and a counter value stored in a memory of the payment card. The encrypted data is forwarded in a request to an application server. The request includes a request to confirm the encrypted data is associated with a payment card authorized to purchase the selected item to purchase. A confirmation of a purchase transaction related to the selected item to purchase is authorized may be received. An indication of receipt of the purchase transaction confirmation may be output to the output device.

Another method is disclosed in which a request for an item for purchase is received from a smart digital device. A query may be generated to locate the item for purchase at a number of merchant websites. The query may be sent to the number of merchant websites. In response to the query, a merchant response from each merchant website is received. Each respective merchant website responds with a merchant response that includes a price of the item for purchase offered for sale by the respective merchant website. The merchant responses are consolidated in a consolidated list of items for purchase. The consolidated list is sent to the smart digital device. A confirmation request from the smart digital device is received. The confirmation request may include an item for purchase selected from the consolidated list and an authentication indication including encrypted data generated by the payment card based on a cryptographic algorithm and an encryption key. The encryption key may be generated based on a master key and a counter value stored in a memory of the payment card. Upon successful confirmation of the payment card, a purchase transaction with the respective merchant for the item for purchase selected from the consolidated list is completed.

Also disclosed is a system including a payment card and a purchase application stored on and executable by a smart digital device. The purchase application may include programming code that when executed provides a user interface. The payment card may include a logic circuit, a payment card near-field communication device, and a payment card memory device. The payment card memory device stores a payment card identifier, a master key and a counter value. The purchase application is operable to perform further functions, including functions to receive an item purchase request including an item available to purchase. The purchase application sends the received item purchase request for confirmation and receives a list of merchants offering the item available for purchase. The purchase application presents the list of merchants in a user interface and receives, via the user interface, a selection of at least one of the merchants selling the item available for purchase. A prompt requesting insertion of the payment card into a vicinity of a near-field communication device of the smart digital device is presented via the user interface. A payment card signal containing encrypted data generated by the payment card using a cryptographic algorithm and an encryption key may be received. The encrypted data includes the payment card identifier and the encryption key may be generated based on a master key and a counter value stored in the payment card memory device. A confirmation request including a payment card identifier may be sent for authentication. A purchase transaction confirmation, in response to an authentication, may be received. An indication of receipt of the purchase transaction confirmation may be output via the user interface.

DETAILED DESCRIPTION

Figure 1:
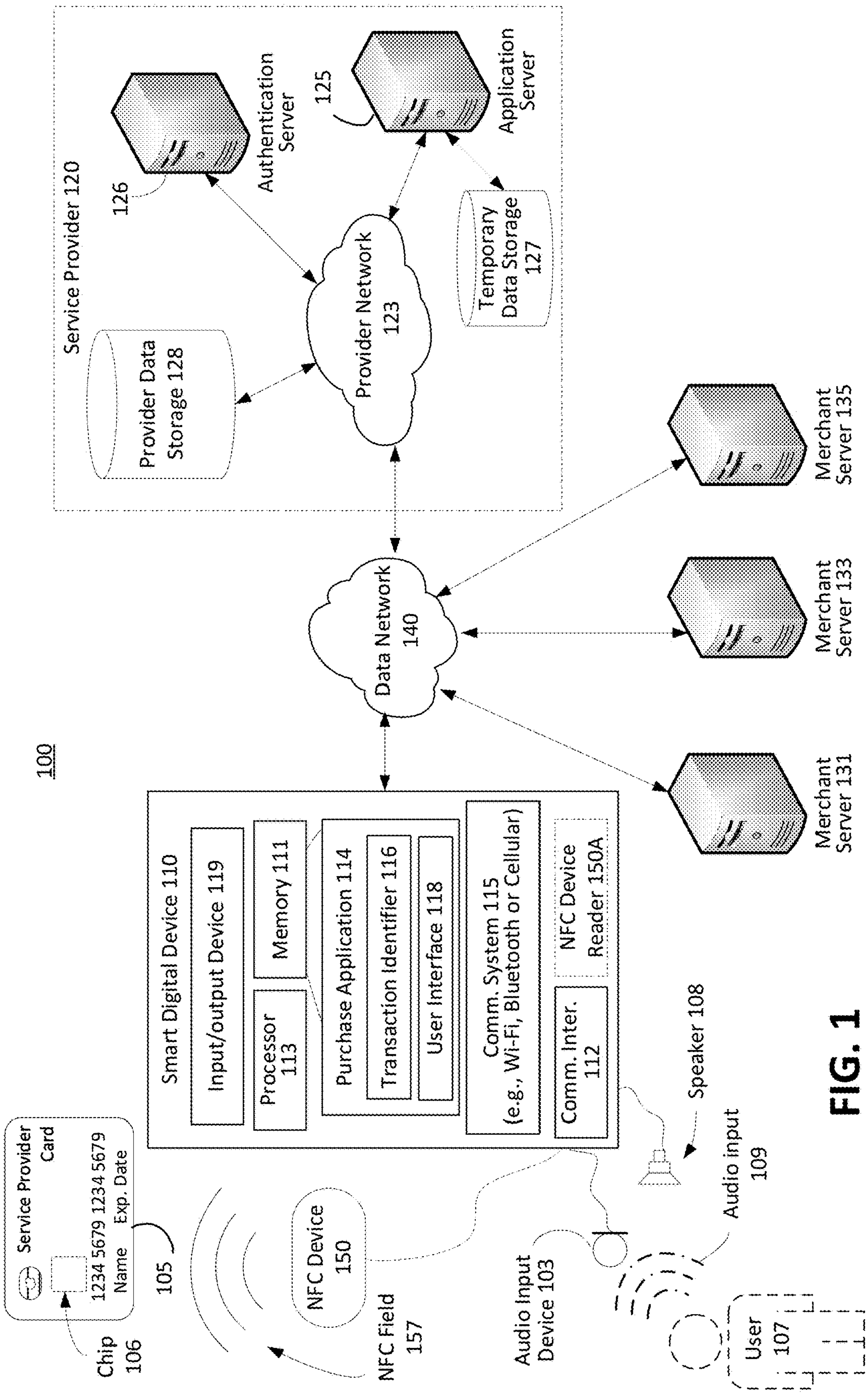
FIG. 1 illustrates an example of an implementation of a system for authenticating voice-based transactions as described herein.

Examples disclosed herein provide authentication techniques and devices to enable authentication of purchase requests made by audio input to a smart digital device. The authenticity of the voice input as an authorized user of a payment card may be verified by inserting a payment card as described herein within range of a near-field communication device coupled to the smart digital device. As a result of the techniques and devices described herein audio input purchase requests are more secure and eliminate a deficiency in prior smart digital assistant devices.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of a system 100 example, consistent with disclosed examples. The system 100 may include a data network 140, a service provider 120, a smart digital device 110, a payment card 105, and one or more merchant servers 131, 133, and 135.

The payment card 105 may (as shown in more detail with reference to FIGS. 2A and 2B) include a logic circuit, a payment card near-field communication device, and a memory device. In an example, the payment card 105 may lack a persistent power source, such as a battery.

The data network 140 may be operable to exchange data and communications. For example, the data network 140 may be at least one of a cellular network, a wide-area network, the Internet, or a combination of different networks that facilitate the exchange of data and communications among the smart digital device 110, the merchant servers 131, 133 and 135, and the service provider 120.

The service provider 120 may include a provider network 123, an authentication server 126, an application server 125, a temporary data storage 127, and a provider data storage 128. The service provider 120 servers and provider network 123 may be coupled to the smart digital device 110 via the data network 140. The authentication server 126 and the application server 125 may also be coupled to the smart digital device 110 via the data network 140. In a specific example, the service provider 120 may be a financial institution. In other examples, the service provider 120 may be a third-party entity or the like, that maintains a trust relationship or other form of relationship that enables the third-party entity to authenticate the payment card 105 to the smart digital device 110. The temporary data storage 127 may be coupled to the application server 125, and may, for example, be operable to store item purchase requests and other information for a predetermined amount of time or until the occurrence of an event, such as a purchase or transaction cancellation. For example, the application server 125 may be operable to provide instances of a purchase application, such as 114, to smart digital devices, such as 110, that request a copy of the purchase application. An instance of the purchase application, such as 114, may be stored in the provider data storage 128 or another storage device (not shown) of the service provider 120.

The merchant servers 131, 133 and 135 may be provided by merchants or by third-parties on behalf of merchants and may be operable to provide items and services for purchase by users via on-line transactions with devices, such as a smart digital device 110 or other computing devices, such as smartphones, tablets, computers, or the like.

The smart digital device 110 is representative of any type of network-enabled smart digital devices, such as Amazon Alexa®, Google Home®, or the like. The smart digital device 110 includes a smart digital device (SDD) processor 113, an audio input device 103 (such as a microphone), input/output device 119 (such as a touchscreen display, a keyboard, a keypad, non-touch display, buttons, gesture recognition-enabled device, eye direction reader, camera, a combination of devices, or the like), a speaker 108, a smart digital device memory 111 that stores programming code, a communication system 115, a communication interface (Inter.) 112 and a near-field communication device 150/150A. The communication interface 112 may be operable to provide a communication interface for the near-field communication device 150/150A or may include a near-field communication device communication interface.

The audio input device 103 may be, for example, a microphone or other device that enables the conversion of sound, or audio, into electrical signals. For example, the audio input device 103 may be a micro-electro-mechanical transducer device or the like. The speaker 108 may be an audio output device that outputs audio generated by the smart digital device 110, such as music, talk show content, movie audio, synthesized human speech, such as responses to questions posed by users using speech or text input via an input/output device 119 to the smart digital device, prompts for input, questions for additional information or confirmation, or the like.

The communication system 115 may, for example, include different radio frequency and/or optical receivers and/or transmitters under control of the processor 113. For example, the communication system 115 may include a Wi-Fi transceiver (i.e., 802.11x), a Bluetooth transceiver a cellular transceiver or a similar radio frequency transceiver. In addition, the communication system may include an optical receiver and/or transmitter, such as an infrared (IR) frequency light detector or the like. The communication system 115 may be coupled to one or more antennas (not shown) the enable the receipt and transmission of data by and from the smart digital device 110. The communication system 115 may be coupled to the communication interface 112.

The communication interface 112 may include couplings for connecting devices or supplying power to the smart digital device 110 via a universal serial bus (USB) connector, a micro-USB, or other standard or proprietary connectors.

The near-field communication device 150 may connect to the smart digital device 110 using a wired or wireless connection. For example, the near-field communication device 150 may couple to the communication interface 112 via a wired connection. The communication interface 112 may be coupled to the processor 113 which may determine how to route data or power received via the connection the communication interface 112. Alternatively, if the near-field communication device 150 couples to the smart digital device 110 via a wireless connection the communication system 115 may utilize a Bluetooth transceiver or the like to pair with the near-field communication device 150. Alternatively, the smart digital device 110 may include a near-field communication device, such as 150A, that is incorporated within the smart digital device 110, and that does not require equipment external to the smart digital device, such as 150.

In an example, the smart digital device memory 111 of the smart digital device 110 in addition to storing programming code includes an instance of a purchase application 114. The purchase application 114 may be a computer application that when executed by the processor 113 may be representative of any type of computer application in which a user may provide payment information to complete a transaction. For example, the purchase application 114 may allow users of the smart digital device 110 to select and purchase goods, products, and/or services via the communication system 115. In one embodiment, the purchase application 114 may be a web-based application that is accessed using a web browser (not pictured). For example, in a web-based application, the web browser may access a website of the merchant and/or progressive web applications provided by the merchant.

As shown, the purchase application 114 may utilize a transaction identifier 116. As described in greater detail herein, the purchase application 114 may be software, hardware, and/or a combination of software and hardware that allows users to pay for transactions initiated by a voice input to the smart digital device 110. The transaction identifier 116 may be a unique identifier associated with a given transaction to be performed with a merchant and/or a merchant server, such as 131, 133 or 135 associated with the merchant. For example, the transaction identifier 116 may be a unique alphanumeric identifier, a unique session alphanumeric identifier, a file, or the like. The transaction identifier 116 may be generated by the purchase application 114.

The purchase application 114 may also include programming code that provides a user interface 118. When programming code providing the user interface 118 is executed, the user interface 118 is operable to receive inputs from the input/output device 119 and provide outputs to the input/output device 119. For example, inputs and outputs related to selecting and purchasing goods, products, and/or services may be received by or output from the user interface 118.

In a brief operational example, a user, such as 107 may use the purchase application 114 to select via an audio input (such as 109) or a touch (not shown) to the input/output device 119 one or more items and/or services from a list or menu for purchase. When the user has selected the desired items and/or services, the user may encounter an interface for completing the transaction (e.g., a cart page, a checkout page, etc.) via the purchase application 114. Advantageously, the purchase application 114 may facilitate authentication of the audio input 109 (e.g., payment) using the payment card 105. For example, the purchase application 114 may output a prompt in the display device for completing the authentication of the audio input 109. For example, the prompt, such as an audio prompt, a text prompt presented on a display screen, a vibration, or the like) may instruct the user to either tap the smart digital device 110 with the payment card 105 or move the payment card 105 in close proximity to the smart digital device 110, thereby bringing the payment card 105 sufficiently close to a near-field communication field 157 of the near-field communication device 150/150A of the smart digital device 110 to enable data transfer (e.g., NFC data transfer, Bluetooth data transfer, etc.) between the chip 106 of the payment card 105 and the near-field communication device 150/150A of the smart digital device 110. In some examples, the smart digital device 110 may trigger the near-field communication device 150/150A via an application program interface (API). In one example, the smart digital device 110 triggers the near-field communication device 150/150A via an API call responsive to the user 107 tapping or placing the payment card 105 in close proximity to the near-field communication device 150/150A of the smart digital device 110. In addition, and/or alternatively, the smart digital device 110 may trigger the near-field communication device 150/150A based on periodically polling the near-field communication device 150/150A after receipt of the audio input 109 or after generating the prompt to place the payment card in range of the near-field communication device 150/150A. Additional details and examples are described with reference to FIGS. 3 and 4.

Figure 2A:
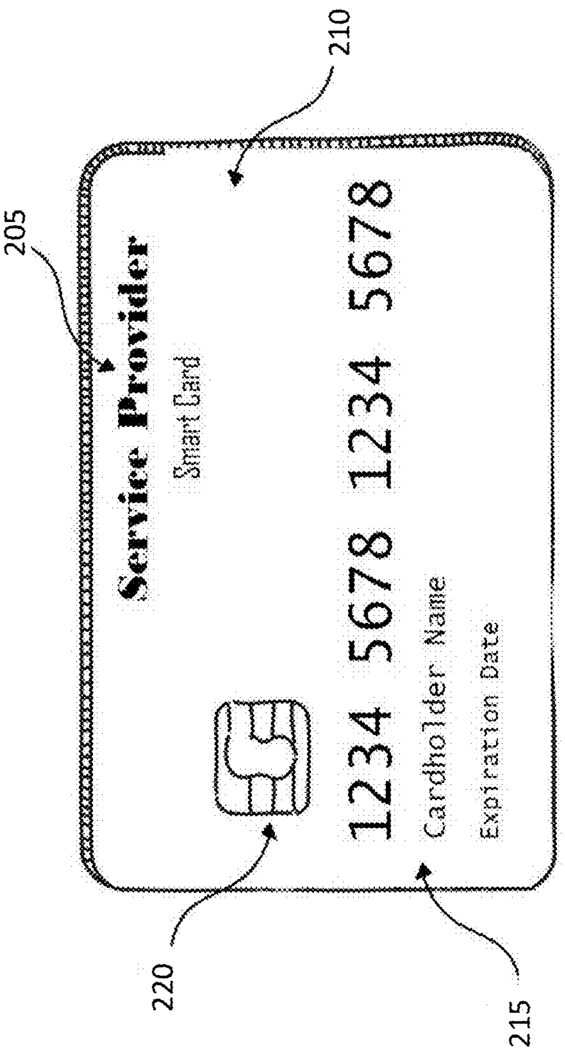
FIG. 2A illustrates a general view of an example payment card having a secured chip suitable for use with the system and processes described herein.
Figure 2B:
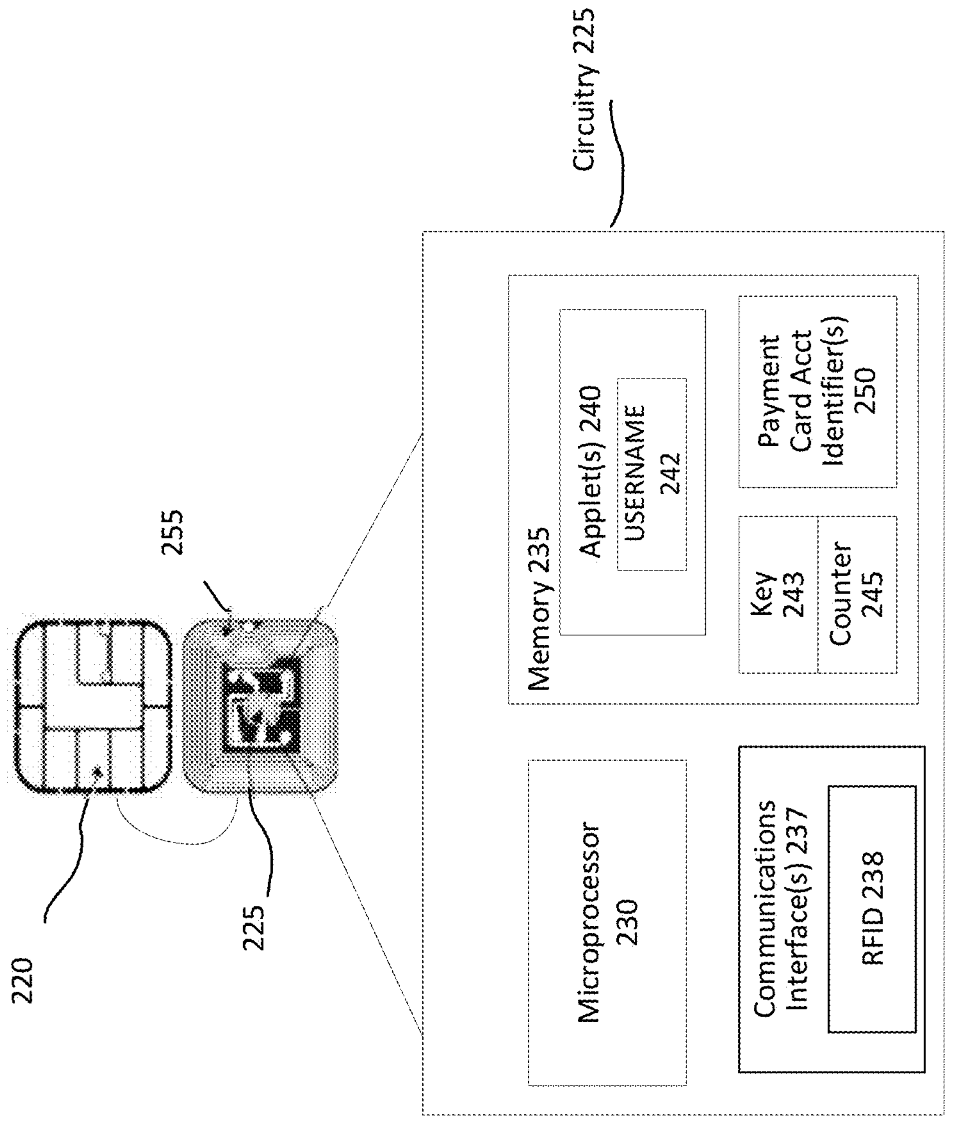
FIG. 2B illustrates a more detailed view of an example of the secured chip of the payment card example of FIG. 2A.

It may be helpful to provide details of the payment card by discussing FIGS. 2A and 2B. In the examples of FIGS. 2A and 2B, the payment card 200 may comprise a dual-interface, contactless payment card. For example, the payment card 200 may comprise a substrate 210, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the payment card 200 may have physical characteristics compliant with the ID-1 format of the ISO/IEC 7810 standard, and the payment card may otherwise be compliant with the ISO/IEC 14443 standard. However, it is understood that the payment card 200 according to the present disclosure may have different characteristics, and the present disclosure does not require a payment card to be implemented in a payment card.

The payment card 200 may also include identification information 215 displayed on the front and/or back of the card that identifiers an authorized user of the payment card 200, a service provider name 205, and a contact pad 220. The contact pad 220 may be configured to establish contact with another communication device, such as a user device, smart phone, laptop, desktop, or tablet computer. The payment card 200 may also include processing circuitry, antenna and other components not shown in FIG. 2A but that are described in more detail with reference to FIG. 2B. These components may be located behind the contact pad 220 or elsewhere on the substrate 210. The payment card 200 may also include a magnetic strip or tape, which may be located on the back of the card (not shown).

As illustrated in FIG. 2B, underneath (and coupled to) the contact pad 220 may be processing circuitry 225 for processing and storing information, including a microprocessor 230 and a memory 235. It is understood that the processing circuitry 225 may, for example, contain additional components, including processors, memories, error and parity/CRC checkers, data encoders, anti-collision algorithms, controllers, command decoders, security primitives, tamper-proofing hardware, or the like as necessary to perform the functions described herein.

The memory 235 may, in an example, be a read-only memory, write-once read-multiple memory or read/write memory, e.g., RAM, ROM, and EEPROM, and the payment card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory 235 is programmed, it may not be rewritten, but it may be read many times.

The memory 235 may be operable to store one or more applet(s) 240, one or more counters 245, and a payment card account identifier 250. The one or more applet(s) 240 may comprise one or more software applications associated with a respective one or more service provider applications (provided, for example, by service provider 120 of FIG. 1) and operable to execute on one or more payment cards, such as a Java Card applet. According to an example, each applet may store a username for a user associated with the payment card account to access the associated service provider application.

The one or more counters 245 may comprise a numeric counter sufficient to store an integer. For example, the payment card 200 may include username 242, an encryption key 243 and counter 245 information that may be transformed by the microprocessor 230 using cryptographic algorithms to generate an encryption key including a dynamic password that may be used by the service provider's authentication server 126 of FIG. 1 to authenticate the transaction via the smart digital device 110. For example, the microprocessor 230 may use the payment card account identifier(s) 250, the encryption key 243, and a value from the counter 245, in cryptographic processing functionality provided by the microprocessor 230 to generate an encryption key including a dynamic password that may be used, together with the username, to authenticate a purchase transaction conducted via the smart digital device 110. Examples of encryption key generation techniques are described in U.S. patent application Ser. No. 16/205,119, filed Nov. 29, 2018, the entire contents of which is incorporated by reference herein in its entirety. In one example, the dynamic password relates to the counter. In such an example, the dynamic password thus advantageously reflects previous behaviors of the holder of the card. For example, the counter-based dynamic password may reflect the number of times that the user has used the payment card to obtain a particular service of the service provider 120, which is a knowledge factor that is virtually impossible for a malicious third party to ascertain. For example, the number of times the payment card is used may be stored as the counter 245 value in a secure memory of the payment card and the counter value may be incremented each time the payment card is used in a transaction.

The payment card account identifier 250 may comprise a unique alphanumeric identifier assigned to a user of the payment card 200 and/or one or more keys that together may be used to distinguish the user of the payment card from other payment card users. In some examples, the payment card account identifier 250 may include information identifying both a customer and an account assigned to that customer and may further identify the payment card associated with the customer's account. According to some aspects, the username 242 may be derived from a combination of the one or more of the payment card account identifier 250 and/or one or more encryption keys 243.

The microprocessor 230 and elements of memory 235 in the foregoing examples are described with reference to the contact pad 220, but the present disclosure is not limited thereto. It is understood that these elements may be implemented outside of the contact pad 220 or entirely separate from it, or as further elements in addition to microprocessor 230 and memory 235 elements located within the contact pad 220.

In some examples, the payment card 200 may comprise one or more antennas 255. The one or more antennas may be placed within the payment card 200 and around the processing circuitry of the contact pad 220. For example, the one or more antennas 255 may be integral with the circuitry 225 and the one or more antennas may be used with an external booster coil. As another example, the one or more antennas may be external to the contact pad 220 and the circuitry 225. The payment card 200 circuitry 225 may include one or more communications interface(s) 237, such as a radio frequency identification (RFID) chip 238, operable to communicate with a smart digital device, such as 110 of FIG. 1, via one or more short-range wireless communication protocols such as near-field communication (NFC), the EMV standard, or the like, and in conformance with ISO/IEC 14443. In some examples, the RFID chip 238 may be referred to as a payment card near-field communication device. Although NFC is used as an example communications protocol, the disclosure is equally applicable to other types of wireless communications, such as the EMV standard, Bluetooth, and/or Wi-Fi.

As explained above, the payment card 200 may be built on a software platform operable on smart cards or other devices that comprises program code, processing capability and memory, such as JavaCard. In some examples, applets may be added to contactless payment cards to generate a one-time password (OTP) for multifactor authentication (MFA) in various mobile application-based use cases. Applet(s) 240 may be configured to respond to one or more requests, such as near-field data exchange (NDEF) requests, from a reader, such as a Near Field Communication (NFC) reader and produce an NDEF message that comprises a cryptographically secure OTP encoded as an NDEF text tag. Thus, the functionality of the contactless payment card is adapted to authenticate a voice purchase request made by a user who is authorized to make the requested purchase and complete the electronic transaction as described below with reference to FIGS. 3 and 4.

Figure 3:
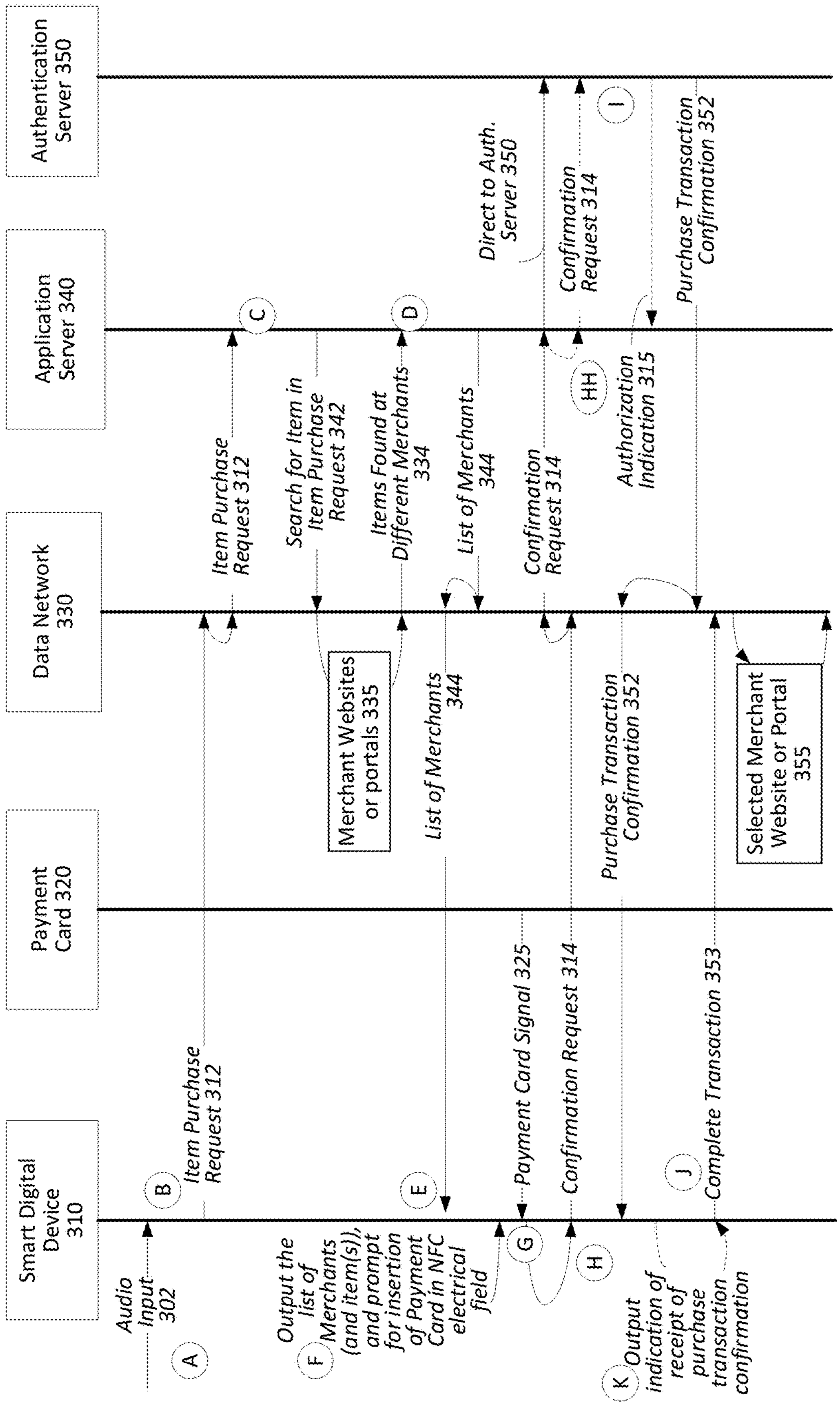
FIG. 3 illustrates an example of data flow for authenticating voice-based transactions in a system, such as the example system illustrated in FIG. 1 and payment card details of FIGS. 2A and 2B.

FIG. 3 illustrates an example of data flow for authenticating voice-based transactions in a system, such as the example system illustrated in FIG. 1.

The exchange of data in data flow of system 300 may be between several devices and/or components such as those described with reference to FIGS. 1, 2A and 2B. Therefore, the discussion of FIG. 3 may reference the devices and components shown in FIGS. 1-2B. In the example of FIG. 3, each of a smart digital device 310, a payment card 320, a data network 330, merchant websites or portals 335, an application server 340 and an authentication server 350 may be coupled to exchange data to facilitate the completion of authorized purchase transactions with merchant websites or portals 335.

For example, the smart digital device 310 includes a smart digital device processor (not shown in this example) that may be similar to smart digital device processor 113 described above with reference to FIG. 1. At A, an audio input 302 may be generated by a user, such as 107 in FIG. 1. The smart digital device processor may receive the audio input 302 via an audio input device of the smart digital device. At B, the audio input 302 may be used to generate an item purchase request that may include an item available to purchase. For example, the user 107 of FIG. 1 may speak the phrase, "Order [Brand name] dog food, 40-pound bag" as an audio input 302 to the smart digital device 310. An audio input device, such as a microphone, receives the audio input 302. The audio input 302 may be processed, for example, using known natural language speech-to-text conversion, natural language processing, or the like. For example, speech recognition systems like Cortana®, Siri®, and Alexa® or other natural language processing applications may provide suitable voice-input conversion for generating the item purchase request 312.

The processor of the smart digital device 310 sends the received item purchase request 312 via the data network 330 to the application server 340. At C, the application server 340 may process the received item purchase request 312 to generate a search query. In a detailed example, in response to receipt of the item purchase request from the smart digital device via the data network, the application server 340 may generate a query to locate the item for purchase at a number of merchant websites (or merchant portals) 335. The merchant websites or portals 335 may be coupled to the application server via the data network 330. For example, the application server 340 may be operable to accessing merchant websites 335 via the data network 330 and receive results of a search (D) using the generated query for the item included in the item purchase request 342. For example, the application server 340 may receive, in response to the query, a merchant response to the query from a respective merchant server of the number of merchant servers. For example, each respective merchant server may respond with a merchant response that includes a price of the item for purchase offered for sale by the respective merchant server. The merchant websites or portals 335 may return a search result to the application server as items found at different merchants 334. The application server 340, at D, may consolidate the merchant responses by populating a consolidated list of items for purchase, for example, according to a merchant identifier, the payment card identifier in the item purchase request, or the like. The application server 340 send the populated consolidated list of merchants 344 to the smart digital device 310.

At E, the smart digital device 310 may receive via the data network from the application server 340 results showing a number of merchants offering the item available for purchase. In response, the application server 340 may be operable to use the items found at the different merchants' websites or portals to generate in a consolidated list of merchants 344 that are able to provide the item available for purchase. In an example, the list of merchants 344 may include each merchant's price for the item available to purchase. In other examples, the list of merchants 344 may include a merchant name and a price for the item available for purchase from the merchant.

The smart digital device 310 receives the list of merchants 344, at E, from the application server 340. The smart digital device processor may present the list of merchants 344 on a display device of the smart digital device 310 (F). Alternatively, or in addition, the application server 340 may have information related to a mobile device, such as a mobile device telephone number or other information related to the mobile device. Using the information related to the mobile device, the application server may send an SMS message or cause an application, such as an instance of the purchase application 114 executing on the mobile device, to present the list of merchants 344 on a display device of the mobile device (not shown). In an example, the mobile device may couple to the smart digital device, via Bluetooth or Wi-Fi, for example, and provide commands to the smart digital device 310.

In the examples at F, the presented list of merchants 344 may be accompanied with a prompt for a user to insert a payment card to authenticate and approve the purchase transaction. Alternatively, or in addition, in response to the presentation of the list of merchants, the smart digital device processor may receive a selection of at least one of the merchants selling the item available for purchase via a user input either through a voice input received by the microphone or another input device. The received selection indicating that the user desires to complete a purchase transaction for the item available for purchase from the selected merchant. In response to the selection, a prompt requesting insertion of the payment card into the near-field communication device of the smart digital device may be presented on the display device or output as synthesized audio prompt via the speaker. For example, the smart digital device processor may have a number of pre-determined prompts or commands stored in memory that may be output to the display device, the speaker or both.

In response to the prompt, a user may bring the payment card 320 within range of the electric field (for example, by tapping the payment card 320 against or near the smart digital device 310) of an NFC device that is either within or coupled to the smart digital device 310. The payment card 320 may, for example, be tapped against the smart digital device 310 or placed in close enough proximity to the smart digital device 310. In an example, the smart digital device may receive a payment card signal 325 from the payment card. For example, the payment card 320 may detect an electric field and respond by emitting the payment card signal 325 via a payment card near-field communication device (not shown in this example). The payment card signal 325 may include encrypted data or information. The payment card 320 may, for example, in response to the detected electric field, transmit to the smart digital device 310 the payment card signal 325 containing a payment card identifier related to an issuer of the payment card 320 and to an account associated with the payment card 320. The payment card identifier may be encrypted by a cryptographic algorithm executed on the payment card 320. The issuer of the payment card 320 may be the service provider (e.g., service provider 120 of FIG. 1), an entity related to the service provider, or the like.

At G, a payment card signal 325 may be received via the near-field communication device of the smart digital device 310. In an example, the payment card signal 325 may contain encrypted data generated by the payment card using a cryptographic algorithm and an encryption key. The encryption key stored in a memory (not shown in this example) of the payment card 320 may be generated by a logic circuit or processor within the payment card 320, for example, based on a master key and a counter value (obtained for example from counter 245 of FIG. 2B) stored in the memory of the payment card 320. For example, the payment card 320 may be operable to detect an electric field output by the near-field communication device (not shown in this example) of the smart digital device 310. A logic circuit or processor of the payment card 320 may retrieve a payment card identifier from a memory device of the payment card 320. The logic circuit using a cryptographic algorithm, such as SHA-264 or others used in the payment card art, may encrypt the payment card identifier and generate the payment card signal including the encrypted payment card identifier.

A confirmation request 314 may be generated by the payment card 320 processor or logic circuit (H). The confirmation request 314 may include a payment card identifier and a generated encryption key as well as other information, such as encrypted data, if appropriate. For example, the confirmation request 314 may include as other information selections of an item for purchase, a merchant from the consolidated list of merchants, and an authentication indication. The authentication indication may, for example, include a payment card identifier and an indication (such as a bit setting, code value or the like) that the payment card identifier was obtained in response to the payment card being inserted in a near-field communication electrical field associated with the smart digital device 310. In other examples, the encrypted data may be generated by the payment card based on a cryptographic algorithm and a diversified key. For example, the diversified key stored in a memory of the payment card 320 and a logic circuit or processor within the payment card may generate the diversified key based on a master key and a counter value stored in the memory of the payment card 320. The confirmation request 314 may be sent to the authentication server 350 for authentication of the payment card 320.

In an example that may be optional, at HH, instead of the confirmation request 314 being sent directly to the authentication server 350, the confirmation request 314 may be sent to the application server 340. The application server 340 may be operable to process the confirmation request 314. For example, the application server 340 may be operable to extract the encrypted authentication indication from the confirmation request 314 and forward the encrypted authentication indication extracted from the confirmation request 314 to an authentication server 350. The authentication server 350 may process the authentication information and, in response, the authentication server 350 may forward an authorization indication 315 indicating the payment card number is authorized to complete the purchase transaction to the application server 340.

The authentication server 350 is operable to perform various functions including authentication functions. For example, at I, the authentication server 350 is operable to receive the confirmation request 314. In the example, the confirmation request 314 may include an item for purchase selected from the consolidated list of merchants and the authentication indication to confirm the payment card is linked with the item purchase request. Of course, the confirmation request 314 may include additional information, such as an authentication indication, a name of an authorized user of the payment card or the like, an encryption key, or more or less data related to the merchant and the item to be purchased. The authentication indication may include encrypted data generated by the payment card based a cryptographic algorithm and a diversified key, the diversified key stored in a memory of the payment card and generated based on a master key and a counter value stored in a memory of the payment card 320. For example, the authentication indication may be encrypted prior to inclusion in the confirmation request 314.

The smart digital device 310 may receive a purchase transaction confirmation 352 from the authentication server 350. The purchase transaction confirmation 352 indicates the successful confirmation of the payment card 320 using the information in the received confirmation request 314. In response to receipt of the purchase transaction confirmation 352 by the smart digital device 310, the smart digital device 310 upon receipt of the purchase transaction con may be completed (i.e., complete transaction 353) with the respective merchant via the selected merchant website or portal 355 for the item for purchase selected from the consolidated list (J).

In addition, the smart digital device 310 may also, in response to receipt of the purchase transaction confirmation 352 by the smart digital device 310, output an indication of receipt of the purchase transaction confirmation 352 via an output device, such as the display device, the speaker of the smart digital device 310 or both (K).

In another example, a user, such as 107 of FIG. 1, may initiate multiple item purchase requests for different or similar items. The system 300 may, for example, queue the multiple purchase requests for later action by an authorized user of the payment card. Such an example, a user only has to authenticate his purchases once for multiple purchases made a different times throughout a time period (e.g., one hour, a day, a week or the like). A process for managing and acting on the multiple purchase requests is described with reference to FIG. 4.

The process 400 may be performed by a system such as the system 100 shown and described with reference to FIG. 1. For example, in process 400, an application server, such as 125 may perform a number of functions in cooperation with a temporary data storage, such as temporary data storage 127 of FIG. 1.

Figure 4:
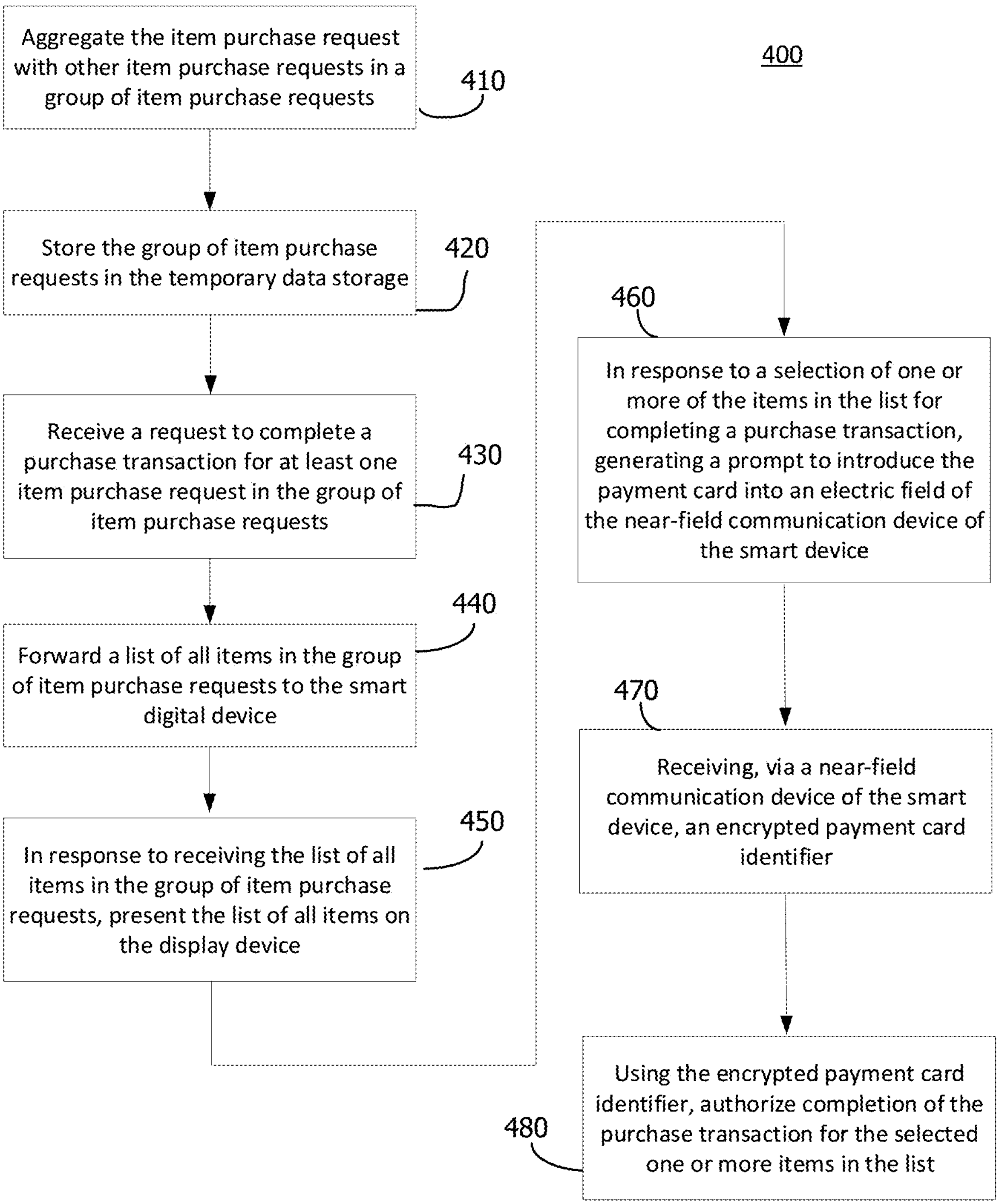
FIG. 4 presents a flow chart for another example of authenticating voice-based transactions in a system, such as the example system illustrated in FIG. 1 and payment card details of FIGS. 2A and 2B.

The application server, such as 125 of FIG. 1 or 340 of FIG. 3, is operable to perform additional functions, such as the process 400 illustrated in FIG. 4. For example, at 410, the application server 340 may be operable to aggregate a received item purchase request with other item purchase requests in a group of item purchase requests. The group of item purchase requests may be stored (420) in the temporary data storage, such as temporary data storage 127 of FIG. 1. In an example in which a group of item purchase requests are received, the application server, such as 125, may forward a list of all items in the group of item purchase requests to the smart digital device, such as 110 of FIG. 1. In response to forwarding the list, the application server may receive from the smart digital device, at 430, a request to complete a purchase transaction for at least one item purchase request in the group of item purchase requests is received by the application server. The request to complete a purchase transaction may, for example, be sent as part of the confirmation request 314 of FIG. 3 or as part of the complete transaction 353 of FIG. 3. At 440, a list of all items in the group of item purchase requests may be forwarded to the smart digital device.

The smart digital device may also perform functions in cooperation with the application server. For example, in response to receiving the list of all items in the group of item purchase requests, the list of all items may be presented on a display device of the smart digital device (450). A smart digital device may receive an input that selects one or more of the items in the list for purchase. In response to a selection of one or more of the items in the list for completing a purchase transaction, a prompt may be generated by the smart digital device to introduce a payment card into an electric field of the near-field communication device of the smart device (460). The smart digital device may receive via the near-field communication device an encrypted payment card identifier when the payment card is introduced into an electric field of the near-field communication device of the smart device (470). Using the encrypted payment card identifier, the smart digital device may request authorization from the application server to complete the purchase transaction for the selected one or more items in the list may be requested at 480.

Figure 5:
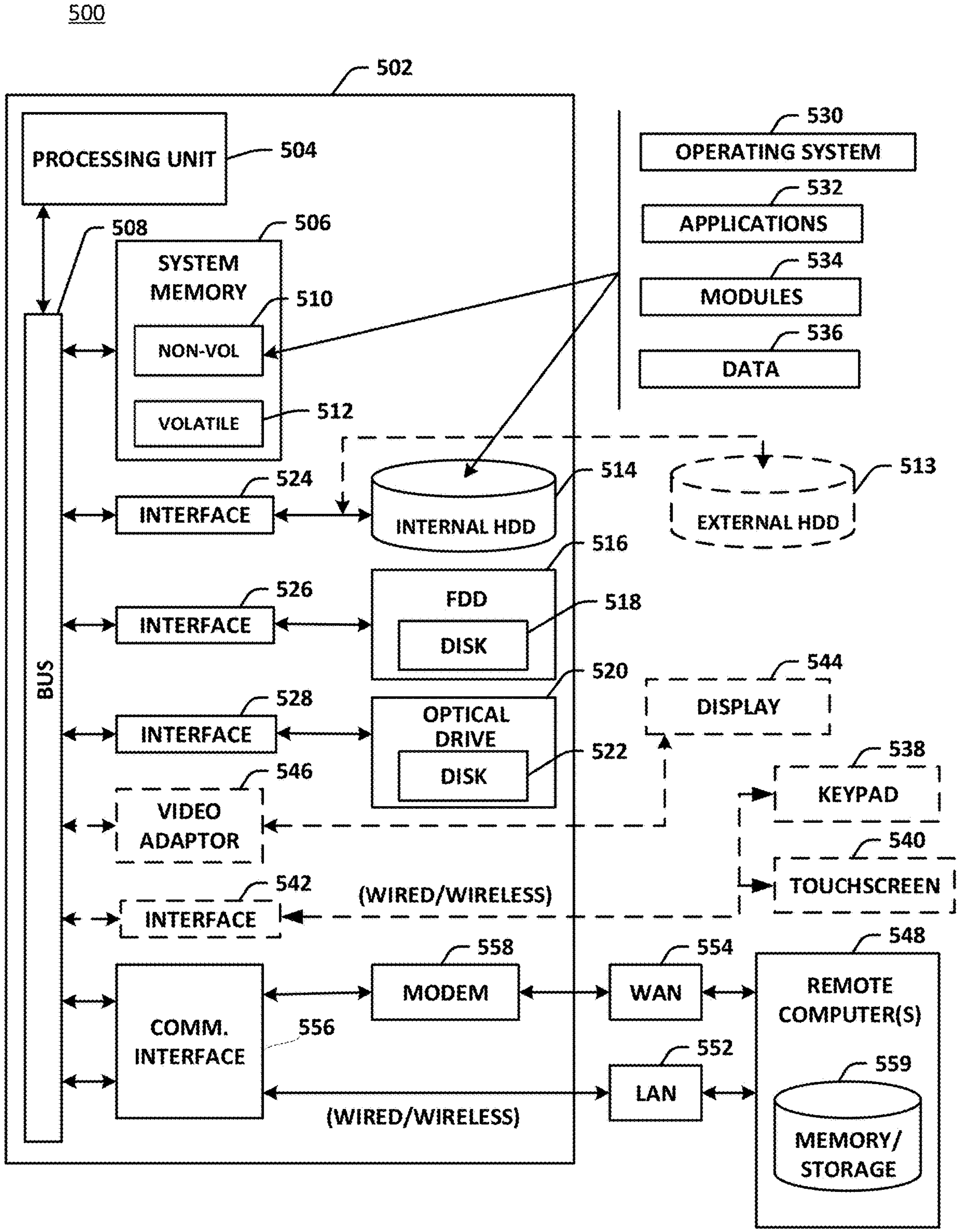
FIG. 5 illustrates an example of a computing architecture suitable for implementing the examples illustrated in FIGS. 1-4.

FIG. 5 illustrates an example of an exemplary computing architecture 500 suitable for implementing various examples as previously described. In one example, the computing architecture 500 may be incorporate elements as may be typically used to implement a server or network platform, if appropriately programmed, as part of system 100. In another example, the computing architecture 500 may be incorporate optional elements that may be typically used to implement a smart digital device or a computing device that may be implemented as part of system 100.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 500.

As shown in FIG. 5, the computing architecture 500 includes a processing unit 504, a system memory 506 and a system bus 508. The processing unit 504 can be any of various commercially available processors or number of processors.

The system bus 508 provides an interface for system components including, but not limited to, the system memory 506 to the processing unit 504. The system bus 508 can be any of several types of bus structures that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal hard disk drive (HDD) 514 (or, optionally, external hard disk drive (HDD) 513), a magnetic floppy disk drive (FDD) 516 to read from or write to a removable magnetic disk 518, and an optical disk drive 520 to read from or write to a removable optical disk 522 (e.g., a CD-ROM or DVD). The HDD 514 or 513, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 510, 512, including an operating system 530, one or more application programs 532, other program modules 534, and program data 536. In one example, the one or more application programs 532, other program modules 534, and program data 536 can include, for example, the various applications and/or components of the computing architecture 500. At least one computer-readable storage medium may include instructions that, when executed, cause a system to perform any of the computer-implemented methods and processes described herein.

Optionally, when configured as a mobile device, a smart digital device, a laptop or the like, the computing architecture 500 may include additional devices to enable data input and output to a user. For example, a user may enter commands and information into the computer 502 through one or more wire/wireless optional input devices, for example, a keypad 538 and a tactile input device, such as a touchscreen 540. Other input devices may include microphones, infrared (IR) remote controls, radio-frequency (RF) remote controls, game pads, stylus pens, near-field communication devices, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through optional interface 542 that is coupled to the system bus 508 but can be connected by other interfaces such as a parallel port, IEEE 1394 serial port, a game port, a USB port, an IR interface, and so forth.

Another optionally element may be display 544, which may be an organic light emitting diode (OLED), light emitting display (LED), or other type of display device, that is also connected to the system bus 508 via an interface, such as an optional video adaptor 546. The display 544 may be internal or external to the computer 502. In addition to the display 544, a computer typically includes other peripheral output devices, such as speakers, printers, and so forth which may be coupled to the system bus 508 via the optional interface 542.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a remote memory/storage device 559 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 may be connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the interface 542. In a networked environment, program modules depicted relative to the computer 502, or portions thereof, can be stored in the remote memory/storage device 559. It will be appreciated that the network connections shown are exemplary and other means of establishing a communications link between the computers can be used.

The computer 502 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions). The wireless technologies may couple to the computer 502 via one or more transceivers (not shown) within for example the interface 542 or communication interface 556 that facilitate the use of the Wi-Fi, WiMax, Bluetooth wireless technologies as well as others.

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As used in this application, the terms “system” and “component” are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-5. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. A method comprising:

receiving, at an application server from a smart digital device, a textual request that is derived from an audio input;

processing, by the application server, the textual request to generate a search query;

accessing, by the application server, a website to perform a search thereon based on the search query;

receiving, by the application server, a response from the website based on the search query, the response including an item associated with the website;

sending, by the application server, a message indicating the item associated with the website to the smart digital device;

receiving, by the application server from the smart digital device, a confirmation request that includes a request for a confirmation of the item and encrypted data from a contactless card associated with the smart digital device, wherein the encrypted data is received in response to the contactless card being inserted in a near-field communication (NFC) electrical field associated with the smart digital device;

causing, by the application server, the encrypted data to be validated by an authentication server; and receiving, by the application server from the authentication server, an authorization message indicating that a transaction for the item is approved, wherein the authorization message is forwarded to the smart digital device to complete the transaction.

2. The method of claim 1, wherein the audio input is received at the smart digital device, and converted by a speech-to-text conversion application operating on the smart digital device to the textual request.

3. The method of claim 1, wherein the website is one of a set of websites, and the search query is generated to perform a corresponding search at each of the set of websites according to the search query.

4. The method of claim 3, wherein receiving the response includes receiving a set of responses from one or more of the set of websites, each of the set of responses including a response from a corresponding website of the set of websites.

5. The method of claim 4, further comprising extracting, by the application server, from the set of responses a consolidated list of items, each item on the consolidated list being associated with a corresponding website of the set of websites.

6. The method of claim 5, wherein sending the message indicating the item to the smart digital device includes sending the consolidated list of items to the smart digital device.

7. The method of claim 5, wherein receiving confirmation of the item includes receiving a selection of the item from among the consolidated list of items.

8. The method of claim 5, wherein the consolidated list of items includes the website associated with a corresponding item on the consolidated list of items.

9. The method of claim 1, wherein the smart digital device is a mobile phone, a smart home device, or a computing device.

10. The method of claim 1, wherein causing the encrypted data to be validated by the authentication server includes the application server extracting the encrypted data from the contactless card from the confirmation request and sending the encrypted data to the authentication server.

11. A computing device comprising:

a processing circuit; and a memory having executable instructions stored thereon, the instructions including instructions for executing a purchase application, which when executed by the processing circuit, cause the processing circuit to:

process a textual request to generate a search query, wherein the textual request is derived from an audio input into a smart digital device;

perform a search on a website based on the search query;

process search results from the website based on the search query, and extract from the search results an item associated with the website that matches the search query;

send a message indicating the item associated with the website to the smart digital device;

receive, from the smart digital device, a confirmation request that includes a request for a confirmation of the item and encrypted data from a contactless card associated with the smart digital device, wherein the encrypted data is received in response to the contactless card being inserted in a near-field communication (NFC) electrical field associated with the smart digital device;

cause the encrypted data to be validated by an authentication server; and receive, from the authentication server, an authorization message indicating that a transaction for the item is approved, wherein the authorization message is forwarded to the smart digital device to complete the transaction.

12. The computing device of claim 11, wherein the audio input is received at the smart digital device, and converted by a speech-to-text conversion application operating on the smart digital device to the textual request.

13. The computing device of claim 11, wherein the website is one of a set of websites, and the processing circuit is configured to perform a corresponding search, using the search query, at each of the set of websites.

14. The computing device of claim 13, wherein the processing circuit is further caused to receive a set of search results from the set of websites based on the search query;

wherein processing the search results includes processing the set of search results from the set of websites.

15. The computing device of claim 14, wherein the processing circuit is further caused to extract from the set of search results from the set of websites a consolidated list of items, including the item, each item on the consolidated list being associated with a corresponding website of the set of websites.

16. The computing device of claim 15, wherein sending the message indicating the item to the smart digital device includes the processing circuit being caused to send the consolidated list of items to the smart digital device.

17. The computing device of claim 15, wherein receiving confirmation of the item includes the processing circuit being caused to receive a selection of the item from among the consolidated list of items.

18. The computing device of claim 15, wherein the consolidated list of items includes the website associated with a corresponding item on the consolidated list of items.

19. The computing device of claim 11, wherein the smart digital device is a mobile phone, a smart home device, or a computing device.

20. The computing device of claim 11, wherein causing the encrypted data to be validated by the authentication server includes the processing circuit being configured to extract the encrypted data from the contactless card from the confirmation request and send the encrypted data to the authentication server.

* * * * *